(12) United States Patent
Ferrier et al.

(10) Patent No.: US 11,702,193 B1
(45) Date of Patent: Jul. 18, 2023

(54) SYSTEMS AND METHODS FOR AN ELECTRIC VERTICAL TAKEOFF AND LANDING AIRCRAFT BRAKING SYSTEM

(71) Applicant: BETA AIR, LLC, South Burlington, VT (US)

(72) Inventors: Lochie Ferrier, Burlington, VT (US); Riley Clinton Griffin, Montpelier, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/732,134

(22) Filed: Apr. 28, 2022

(51) Int. Cl.
| B64C 25/48 | (2006.01) |
| B60T 8/17 | (2006.01) |
| B60T 1/10 | (2006.01) |
| B64D 27/24 | (2006.01) |
| B64C 29/00 | (2006.01) |

(52) U.S. Cl.
CPC ............ B64C 25/48 (2013.01); B60T 8/1703 (2013.01); B60T 1/10 (2013.01); B64C 29/0025 (2013.01); B64D 27/24 (2013.01)

(58) Field of Classification Search
CPC ... B64C 25/48; B64C 29/0025; B60T 8/1703; B60T 1/10; B64D 27/24
See application file for complete search history.

(56) References Cited

U.S. PATENT DOCUMENTS

| 4,516,744 | A | * | 5/1985 | Burnside | ................... B60P 3/11 244/50 |
| 8,688,341 | B2 | | 4/2014 | Thibault et al. | |
| 9,815,438 | B2 | | 11/2017 | Hanlon et al. | |
| 10,017,164 | B2 | | 7/2018 | Kanemori et al. | |
| 10,106,250 | B2 | | 10/2018 | Sullivan | |
| 10,259,570 | B2 | | 4/2019 | Iordanidis et al. | |
| 10,604,240 | B2 | | 3/2020 | Goyez et al. | |
| 10,800,392 | B2 | | 10/2020 | Alam et al. | |
| 11,230,372 | B1 | * | 1/2022 | Griffin | ..................... B64C 25/34 |
| 2008/0023591 | A1 | * | 1/2008 | Christensen | .......... B64C 13/044 244/235 |
| 2010/0276988 | A1 | * | 11/2010 | Cahill | ..................... B60T 8/885 303/20 |
| 2011/0079471 | A1 | | 4/2011 | Colin et al. | |
| 2012/0056040 | A1 | * | 3/2012 | Brotherton-Ratcliffe | ..................... B64C 27/20 244/75.1 |

(Continued)

FOREIGN PATENT DOCUMENTS

| JP | 2009262709 A | * 11/2009 | ............. B60T 8/172 |
| WO | 2021089714 | 5/2021 | |

OTHER PUBLICATIONS

Valcor, Electrification of Aircraft Control Systems, Jun. 14, 2021.

(Continued)

*Primary Examiner* — Donald J Wallace
*Assistant Examiner* — Jalal C Coduroglu
(74) *Attorney, Agent, or Firm* — Caldwell Intellectual Property Law

(57) ABSTRACT

Braking systems and methods for an electrical vertical takeoff and landing aircraft are provided. A braking system may contain a pilot control device, brakes, wheels, sensors, and a controller. Pilot controls the pilot control device to transmit information to the controller such that the aircraft will slow down.

19 Claims, 7 Drawing Sheets

(56) References Cited

U.S. PATENT DOCUMENTS

| | | | |
|---|---|---|---|
| 2017/0008503 A1* | 1/2017 | Romana | B60T 8/172 |
| 2019/0031170 A1 | 1/2019 | Mastrocola et al. | |
| 2019/0090800 A1* | 3/2019 | Bosworth | A61B 5/0015 |
| 2019/0176973 A1* | 6/2019 | Cahill | B60T 7/105 |
| 2019/0291853 A1* | 9/2019 | Bolton | B60T 8/1703 |
| 2020/0290742 A1* | 9/2020 | Kumar | B64D 27/24 |
| 2020/0333805 A1* | 10/2020 | English | B64C 13/0421 |
| 2021/0001823 A1 | 1/2021 | Georgin et al. | |
| 2022/0017208 A1* | 1/2022 | Spiegel | B64C 13/505 |
| 2022/0017218 A1* | 1/2022 | Spiegel | B64D 31/12 |
| 2022/0289366 A1* | 9/2022 | Griffin | B64C 25/62 |

OTHER PUBLICATIONS

Matt Thurber, Advent Unveils Electric Power Brakes Concept, Mar. 8, 2018.
Charlie Page, How do aircraft brakes work, Feb. 1, 2020.
Business Wire, Global Aircraft Braking Systems Market, May 30, 2019.
Eric Olson, How do aircraft brakes work_, Oct. 30, 2019.

\* cited by examiner

SYSTEMS AND METHODS FOR AN ELECTRIC VERTICAL TAKEOFF AND LANDING AIRCRAFT BRAKING SYSTEM

FIELD OF THE INVENTION

The present invention generally relates to the field of electric aircrafts. In particular, the present invention is directed to systems and methods for an electric vertical takeoff and landing aircraft braking system.

BACKGROUND

In electric multi-propulsion systems, such as electric vertical take-off and landing (eVTOL) aircraft, there is a need for a braking system for the wheels.

SUMMARY OF THE DISCLOSURE

In an aspect, a braking system for an electric vertical takeoff and landing aircraft is provided. The system comprising: a wheel configured to allow rolling motion of the aircraft on the ground; a brake configured to resist rotation of a wheel; a pilot control device, the pilot control device configured to: detect a measured pilot input; and generate a pilot datum as a function of the measured pilot input; a controller communicatively connected to the aircraft and the pilot control device, the controller configured to: receive the pilot datum from the pilot control device; generate an action command based on the pilot datum; and transmit an action command to at least a control surface.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for a braking system. In an embodiment, this allows for flexibility in takeoff and landing, such that the aircraft may takeoff and land traditionally. Aspects of the present disclosure can also be used to steer the aircraft. This is so, at least in part, because of skid-steering. Exemplary embodiments illustrating aspects of the present disclosure are described below in the context of several specific examples.

Figure 1:
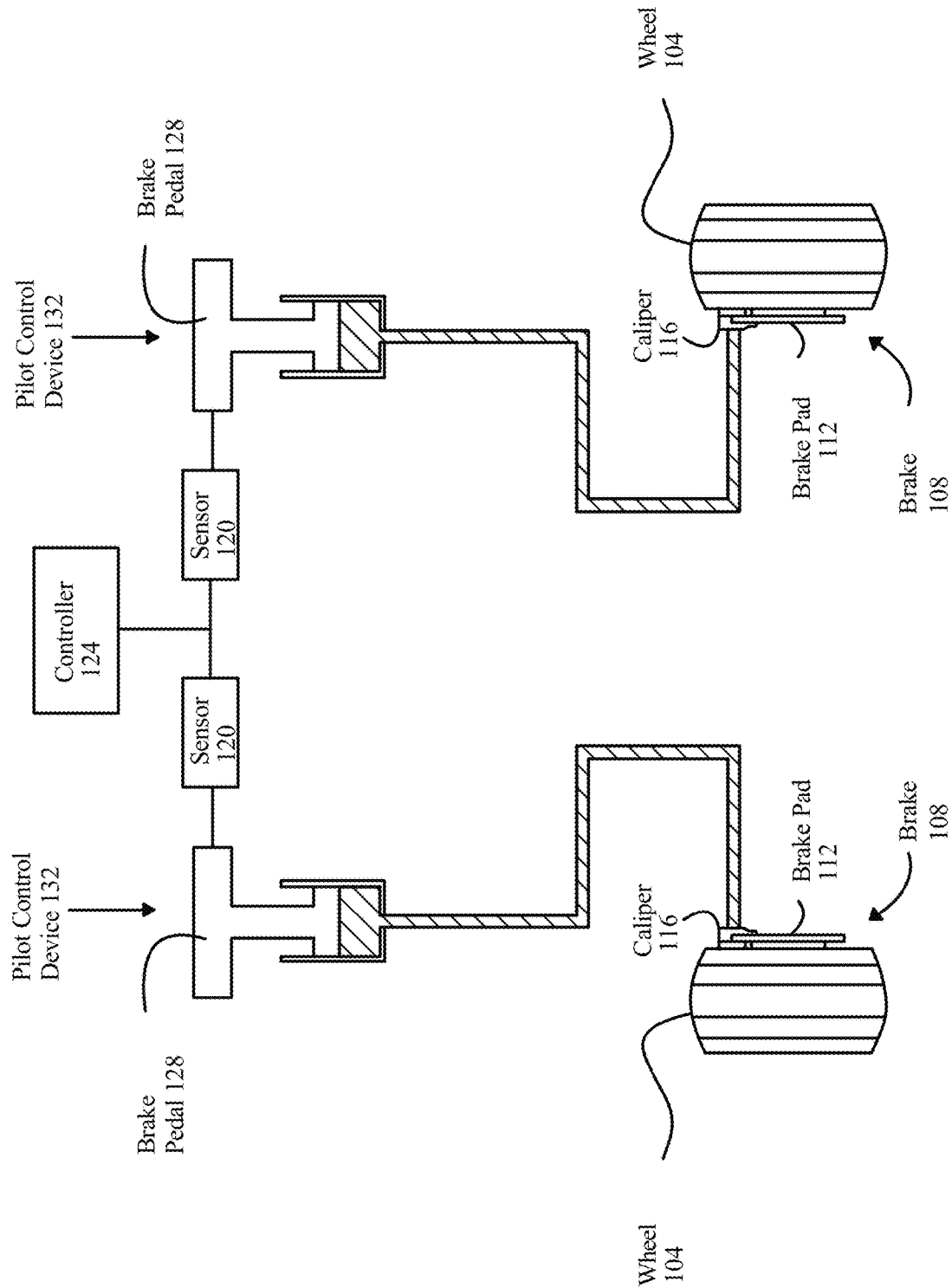
FIG. 1 is an exemplary embodiment of a braking system.

Referring now to FIG. 1, an exemplary embodiment of a braking system 100 for an electric vertical takeoff and landing aircraft (eVTOL) is illustrated. As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 1, system 100 consists of a wheel 104, a brake 108, a pilot control device 132, and a controller 124. Wheel 104 comprises at least a first wheel on the first side of the aircraft and at least a second wheel on the second side of the aircraft. A wheel 104 is configured to allow rolling motion of the aircraft on the ground. As used in this disclosure, a "wheel" is a circular, disc-shaped, and/or annular object that revolves on an axle and/or fulcrum, which may be at a geometric center of the wheel, and is fixed below the aircraft and/or other object to enable it to move easily over the ground. As a non-limiting example, a wheel 104 may include an aircraft wheel. Wheel 104 includes an aircraft tire. As used in this disclosure an "aircraft tire" is an annular component attached to and/or surrounding a rim and/or hub of a wheel such that the tire contacts a surface on which the wheel rests instead of the rim. A tire may be composed at least in part of an elastomeric material such as rubber. An aircraft tire may include an interior lumen or sealed chamber, which may also be annular, and which may be filled with pressurized gas to increase the tire's resistance to elastic deformation, permitting it to bear greater weight without allowing the rim to contact the ground. Aircraft tire may be capable of being exposed to temperatures below −40° C. and/or above 200° C. without losing elasticity or integrity. Aircraft tires may be composed of, without limitation rubber, nylon, cord, and/or steel. Aircraft tires may include a tire tread pattern. As used in this disclosure a "tire tread pattern" is a circumferential groove molded into the rubber of the tire to improve traction. For example, and without limitation, a tire tread pattern may be composed of 4 circumferential grooves molded into the aircraft tire to channel water away from the tire surface. In an embodiment and without limitation, tire tread patterns may be designed to maximize the amount of rubber making contact with the ground to decrease the landing distance and/or enhance braking performance.

Still referring to FIG. 1, aircraft tires may be mounted to aircraft wheel hubs and/or rims. As used in this disclosure an "aircraft wheel hub" is the rim of the wheel that is configured to have an inboard wheel rim and an outboard wheel rim. Aircraft wheel rim may bolt together the inboard wheel rim and outboard wheel rim to secure aircraft tires to the aircraft wheel rim. An O-ring may be placed between the inboard and outboard wheel rim to mate the surface and create a sealed connection. In an embodiment, and without limitation, an aircraft wheel rim may be composed of aluminum, magnesium alloys, polymer composites, and the like thereof. Wheels and/or tires may be configured to include a medium for inflation. Medium may consist of any compound and/or substance that may achieve a particular inflation for wheel. Medium may include substances and/or compounds that aid in reducing the chance of fire and/or explosion. In an embodiment and without limitation a medium may include nitrogen, wherein the nitrogen is trapped between the inboard wheel rim, aircraft tire, and outboard wheel rim. Nitrogen may contain no water vapor reducing the amount of moisture, wherein reducing the amount of moisture may mitigate variations of pressures at temperature extremes. Nitrogen may reduce the amount of oxygen in the tires, wherein reducing the amount of oxygen may reduce the oxidizing power to promote explosions and/or fires. Nitrogen may also reduce corrosion to aluminum and/or steel inboard wheel rim and/or outboard wheel rim. Nitrogen may also reduce reduction of tire pressure as nitrogen may be larger molecules that permeate at slower rates than other mediums. As used in this disclosure "tire pressure" is the amount of force and/or pressure that exists within an aircraft tire when sealed. Tire pressure may include tire pressures consisting of 100 psi-300 psi.

Figure 2:
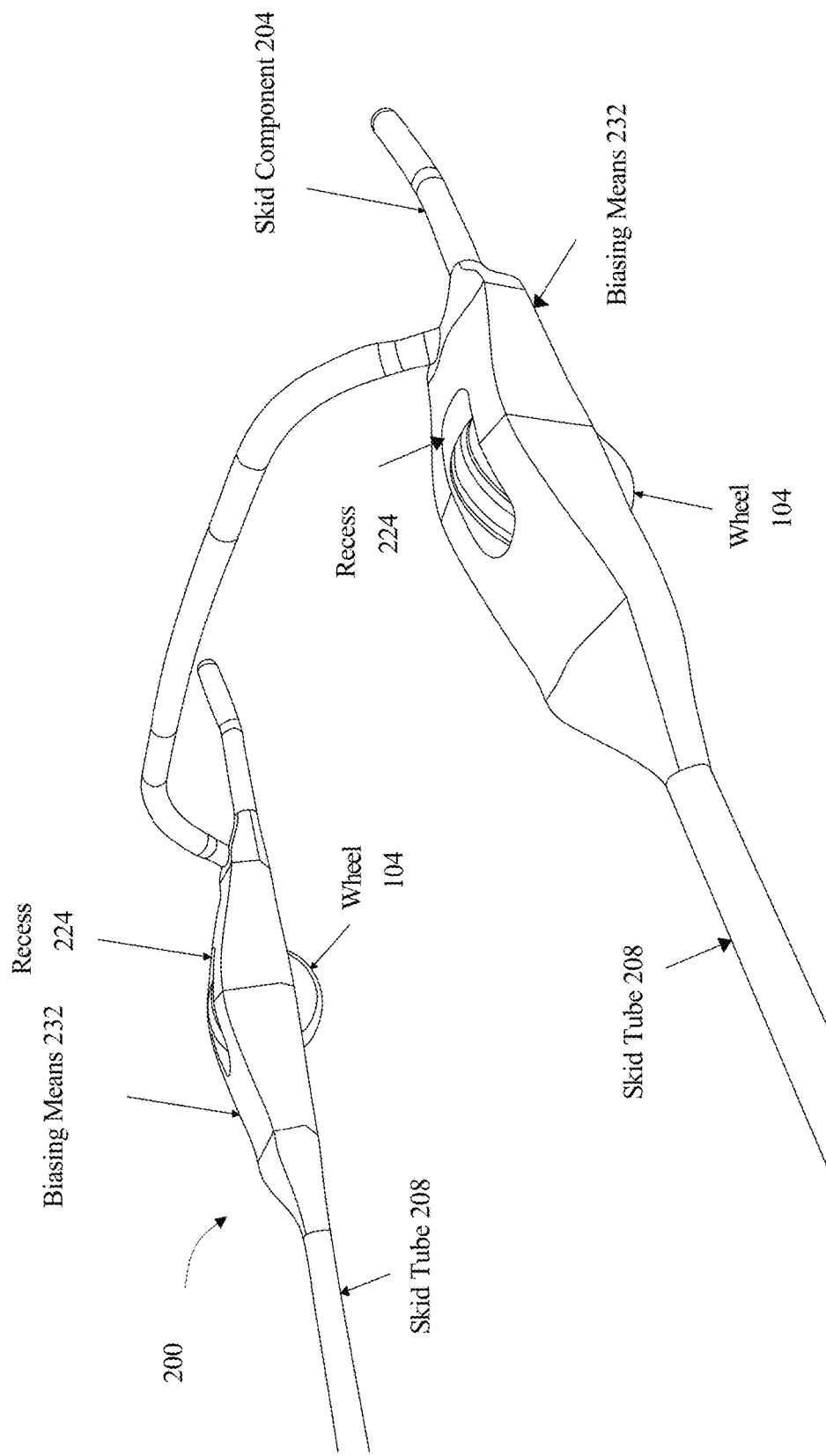
FIG. 2 is a diagrammatic representation of an exemplary embodiment of a system for rolling landing gear.

Referring now to FIG. 2, wheel 104 is housed in a skid tube 208 at the bottom of the eVTOL aircraft. Skid tube 208 may be part of a skid component 204. As used in this disclosure a "skid component" is a component of an undercarriage of an aircraft that supports the weight of the aircraft when it is not in the air. For example, and without limitation, skid component 204 may include a simple landing skid, wherein a simple landing skid may consist of two or more beams, rods, and/or braces that run parallel to one another with a distance separating the two beams, rods, and/or braces. As a further non-limiting example, a skid component may include one or more skis. Skid component 204 may be composed of wood, fabric, aluminum, steel, titanium, polymers, graphite-epoxy, composites, and the like thereof. Skid component 204 may be designed with a consideration of energy absorption during a landing, stress levels in normal landings, and/or an appropriate stiffness to avoid critical ground resonance modes. As used in this disclosure, "attached" means that at least a portion of a device, component, or circuit is connected to at least a portion of the aircraft via a mechanical coupling and/or attachment and/or fastening component and/or mechanism. Attachment may be accomplished, without limitation, by bolting, riveting, welding, press fitting, and the like thereof. For example, and without limitation a solid and/or round head rivet may be used to attach a skid component to an aircraft. As a further non-limiting example, a blind and/or pop rivet may be used to attach a skid component to an aircraft. As a further non-limiting example, an oxy-acetylene weld and/or electric arc weld may be used to attach a skid component to an aircraft. As a further non-limiting example, a shielded metal arc weld and/or gas metal arc weld may be used to attach a skid component to an aircraft. As a further non-limiting example, a composite press-fit insert may be used to attach a skid component to an aircraft. As used in this disclosure a "skid tube" is an elongated member having a tubular form used in a skid component as described above and designed and/or configured to support weight of an aircraft when contacting the ground; a skid tube 208 may be attached to an aircraft by way of a bracing structure such as one or more landing struts or the like. A skid tube 208 may be constructed, without limitation, as a monolithic tube defining a ground contact plane for contact with a ground surface. A skid tube 208 may have a first portion having a cross-section defining first and second axis with the first axis, the second axis and a longitudinal axis of the first portion extending perpendicularly to each other and intersecting at a common point, one of the first and second axis extending along a minimum outer cross-sectional dimension of the cross-section of the first portion, the first axis extending at a smaller angle with respect to the ground contact plane than the second axis. Skid tube 208 may be composed of one or more materials comprised of aluminum alloys, titanium alloys, steel alloys, polymers, polymer composites, tungsten carbides, and the like thereof. In an embodiment, a skid tube 208 may be designed to absorb energy and/or preclude extensive damage to an aircraft in the event of a landing and/or crash. In an embodiment skid tube 208 may be hollow and/or void of a central material. For example, and without limitation a skid tube 208 may be a hollow aluminum shaft consisting of a minimum thickness of aluminum to support the aircraft.

Still referring to FIG. 2, a diagrammatic representation of rolling landing gear is shown. The wheels are housed in a skid tube 208. There may be a recess 224 on the skid tube 208 to house the wheel 204, allowing the wheel 104 to rotate freely. For example, and without limitation recess 224 may include an elliptical shape, wherein the ellipsis is elongated along the longitudinal axis of the skid tube 208. As a further non-limiting example, recess 224 may include an oval and/or pyriform shape that extends along the longitudinal axis of the skid tube 208. In an embodiment, recess 224 may include one or more covered cavities that house a wheel 104. For example, and without limitation a wheel 104 may be house inside of recess 224, wherein the wheel is secured to the rotational fulcrum as a function of the axis such that the wheel 104 is able to freely rotate and/or retract and/or extend as a function of the biasing means 232, wherein a biasing means 232 is described in detail below. For example, and without limitation the wheel 104 be enclosed from any objects and/or mediums from interacting with the wheel 104 other than from the bottom opening of the recess 224. In an embodiment, and without limitation, recess 224 may include a through hole. For example, and without limitation a through hole may include an elliptical shape, oval shape, pyriform shape, and the like thereof, that is uncovered on both the top and the bottom of the recess 224 such that the wheel 104 is able to freely rotate without contact from the skid tube 208. For example, and without limitation, a wheel 104 may be secured in a through hole, such that the top and bottom of the wheel 104 may be exposed to the surrounding ground and/or mediums, wherein the wheel 104 is able to rotate freely and/or retract and/or extend as a function of the biasing means 232, wherein a biasing means 232 is described in detail below. As used in this disclosure a "biasing means" is a mechanism that generates an elastic recoil force when moved or deformed. In an embodiment, biasing means 232 may include a mechanism that generates an elastic recoil force when twisting a material. In another embodiment, biasing means 232 may include a mechanism that generates an elastic recoil force when compressing a material. In another embodiment, biasing means 232 may include a mechanism that generates an elastic recoil force when stretching a coiled material. As a non-limiting example, a biasing means 232 may be a rubber band and/or other elastic and/or elastomeric material that may compress, stretch, and/or twist such that the rubber band releases stored energy and returns to the original shape. Additionally or alternatively, biasing means 232 may include one or more shock absorber characteristics. As used in this disclosure a "shock absorber characteristic" is a damper and/or hydraulic device that absorbs shock impulses. In an embodiment a shock absorber characteristic may include a characteristic of a material that converts kinetic energy of the shock into another form of energy, such as heat. In another embodiment a shock absorber characteristic may include a characteristic that converts a first form of kinetic energy, the shock, into a second form of kinetic energy, such as forcing the wheel 104 into the recess 224. Additional disclosure related to rolling landing gear can be found in U.S. patent application Ser. No. 17/196,719, filed on Mar. 9, 2021, entitled "A SYSTEM FOR ROLLING LANDING GEAR," entirety of which incorporated herein by reference.

Referring back to FIG. 1, system 100 contains a brake 108 configured to resist rotation of a wheel 104. Brakes may comprise of two brakes; each may be attached to a wheel 104. As used in this disclosure, a "brake" is a mechanical and/or electrical device that inhibits motion by absorbing and/or producing energy from a moving system. As a non-limiting example, brake 108 may include aircraft disc brakes, thrust reverses, air brakes, large drogue parachutes, and the like thereof. Brakes may generate a frictional force to slow down the aircraft. For example, and without limitation, biasing means 232 may include generating frictional force as a function of two materials and/or objects interacting with each other. In an embodiment, a caliper 116 may interact with a brake pad to resist the rotation of a wheel 104. As used in this disclosure a "frictional force" is a force resisting the relative motion of solid surfaces, fluid layers, and/or material elements sliding against one another. In an embodiment, and without limitation, frictional force may include a dry friction. As used in this disclosure a "dry friction" is a force that opposes the relative lateral motion of two solid surfaces in contact. Dry friction may be subdivided into static friction, wherein static friction is force generated between non-moving surfaces, and kinetic friction, wherein kinetic friction is force generated by moving surfaces. In another embodiment, and without limitation, frictional force may include a fluid friction. As used in this disclosure a "fluid friction" is a force between layers of viscous fluid that are moving to each other, wherein the force opposes the relative motion. For example, and without limitation, frictional force may be generated as a function of oil and/or water interacting with each other. Frictional force may include a lubricated friction. As used in this disclosure a "lubricated friction" is a force generated as a function of a fluid interacting with a solid surface. For example, and without limitation lubricated friction may include a lubricant and/or fluid that separates two solid surfaces. A brake 108 may include, but not limited to, mechanical brakes configured to use mechanical force to initiate a frictional force, hydraulic brakes configured to use hydraulic pressure to initiate frictional force. Brake includes a regenerative brake configured to generate electrical energy. Regenerative braking, as defined herein, is an energy recovery mechanism that recovers energy using the resistance of motion.

Continuing to reference FIG. 1, brake 108 allows for steering of the aircraft through selective braking of the wheels. Selective braking of the wheels allows for yaw control of the aircraft while grounded. Selective braking of the wheel comprises only engaging the brake on either the at least a first wheel or at least a second wheel. Selective braking may be activated by controller 124 if pilot indicates a change in yaw with a pilot control device 132, discussed below. In this instance, controller 124 may only activate selective braking if aircraft 300 is located on the ground. Selective braking may be activated by pilot by selectively pressing on one brake.

With continued reference to FIG. 1, system 100 contains a pilot control device 132. At least a "pilot control device," for the purpose of this disclosure, is an interactive mechanism or means which allows a pilot to control operation of flight components of an eVTOL aircraft. In a non-limiting embodiment, pilot control device 132 may be used by a pilot to manipulate and/or command the components of an aircraft. Pilot control device 132 may be any gauge, throttle lever, clutch, dial, control, or any other mechanical or electrical device that is configured to be manipulated by a pilot to receive information. Pilot control device 132 also includes brake pedals, as shown in FIG. 1, or rudder pedals. A "rudder," as used in this disclosure, is a vertical stabilizer that controls the yaw of an aircraft. Pilot may change the yaw of the aircraft by pressing on a rudder pedal associated with the direction of turn. In a non-limiting embodiment, pilot control device 132 may be physically located in the cockpit of the aircraft or remotely located outside of the aircraft in another location communicatively connected to at least a portion of the aircraft. Pilot control device 132 may include buttons, switches, or other binary inputs in addition to, or alternatively than digital controls about which a plurality of inputs may be received. In a non-limiting embodiment, the pilot control device 132 may include a physical manipulation of a control like a pilot using a hand and arm to push or pull a lever, or a pilot using a finger to manipulate a switch. In another non-limiting embodiment, the pilot input may include a voice command by a pilot to a microphone and computing system consistent with the entirety of this disclosure. One of ordinary skill in the art, after reviewing the entirety of this disclosure, would appreciate that this is a non-exhaustive list of components and interactions thereof that may include, represent, or constitute, or be connected to pilot control device 132. Pilot control device 132 may contain a sensor 120 or a plurality of sensors to detect pilot input. Pilot control device comprises a sensor configured to at least detect a position of a pedal. Sensors may include pressure sensors, motion sensors, force sensors, etc. to detect movement of pilot control devices. Sensors are discussed in further detail below. "Communicatively connected," for the purposes of this disclosure, is a process whereby one device, component, or circuit is able to receive data from and/or transmit data to another device, component, or circuit; communicative connecting may be performed by wired or wireless electronic communication, either directly or by way of one or more intervening devices or components. In an embodiment, communicatively connecting includes electrically coupling an output of one device, component, or circuit to an input of another device, component, or circuit. Communicatively connecting may be performed via a bus or other facility for intercommunication between elements of a computing device. Communicatively connecting may include indirect connections via "wireless" connection, low power wide area network, radio communication, optical communication, magnetic, capacitive, or optical coupling, or the like.

With continued reference to FIG. 1, pilot control device 132 detects a measured pilot input. Pilot input may be collected using sensors. A "measured pilot input," for the purpose of this disclosure, is a collection of information describing any events related to pilot's actions. In a non-limiting embodiment, the measured pilot input may include pressure of brake pedals, pressure of rudder pedals, degree of steering on a steering wheel, etc. A "pedal," for the purposes of this disclosure, is a lever control located inside an aircraft. A pedal may be located near the pilot's foot such that it is foot operated. In another non-limiting embodiment, the measured pilot input may include a plurality of maneuver data. A "plurality of maneuver data," for the purpose of this disclosure, is any collection of information describing completion by the pilot of procedures and concepts that control the electric aircraft. For example and without limitation, the plurality of maneuver data may include foundational flight maneuvers, such as straight-and-level turns, climbs and descents, and/or performance maneuvers, such that the application of flight control pressures, attitudes, airspeeds, and orientations are constantly changing throughout the maneuver. For example and without limitation, the plurality of maneuver data may include, ground reference maneuvers, such as turns around a point, s-turns, rectangular ground maneuvering course, eights along A road, eights around pylons, hover taxi, air taxi, surface taxi, and the like. As a further example and without limitation, the plurality of maneuver data may include takeoffs and landings, such as normal takeoff and climb, crosswind takeoff and climb, short field takeoff and climb, normal takeoff from a hover, vertical takeoff to a hover, short field approach and landing, soft field approach and landing, touch and go, power-off 180 approach and landing, normal approach to a hover, crosswind approach to the surface, and the like. The plurality of maneuver data may further include, for example and without limitation, airborne maneuvers, such as trimming the aircraft, slow flight, lazy eights, chandelle, straight and level flight, turns, steep turns, unusual attitudes, spatial disorientation demonstration, hovering, hovering turn, rapid deceleration, reconnaissance procedures, and the like. The plurality of maneuver data, as a further non-limiting example, may include emergency preparedness, such as steep spirals, emergency approach and landing, spins, ditching, autorotation, vortex ring state, retreating blade stall, ground resonance, dynamic rollover, low rotor RPM, systems malfunction, flight diversions, and the like. Further, the plurality of maneuver data may include, as a non-limiting example, instrument procedures, such as aircraft holding procedures, arcing approach, instrument landing system approach, instrument reference climbs and descents, basic attitude instrument flight, and the like. Persons skilled in the art, upon reviewing the entirety of this disclosure, will be aware of various procedures and concepts that may represent the plurality of maneuver data consistently with this disclosure.

With continued reference to FIG. 1, pilot control device 132 is configured to generate a pilot datum as a function of the measured pilot input. A "pilot datum," for the purpose of this disclosure, is any datum or element of data describing parameters captured by pilot control device 132, which may include a collection of information describing the intent to brake, steer, change direction, maneuver. For example and without limitation, pilot datum may include, but is not limited to, the pilot input, the pilot command, and the like thereof. In a non-limiting embodiment, pilot datum 108 may include any data captured by any sensor as described in the entirety of this disclosure. Additionally and alternatively, pilot datum may include any element or signal of data that represents crucial flight information captured within a simulation of a flight. For example and without limitation, the crucial flight information may include any data about the virtual environment of the simulated electric aircraft. In a non-limiting embodiment, pilot datum 108 may include a degree of torque that may be sensed, without limitation, using load sensors deployed at and/or around a propulsor and/or by measuring back electromotive force (back EMF) generated by a motor driving the propulsor. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. One of ordinary skill in the art will appreciate, after reviewing the entirety of this disclosure, that motion may include a plurality of types including but not limited to: spinning, rotating, oscillating, gyrating, jumping, sliding, reciprocating, or the like.

With continued reference to FIG. 1, system includes a controller 124 communicatively connected to the aircraft and the pilot control device 132. Controller 124 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Controller 124 may include a single computing device operating independently, or may include two or more computing device operating in concert, in parallel, sequentially or the like; two or more computing devices may be included together in a single computing device or in two or more computing devices. Controller 124 may interface or communicate with one or more additional devices as described below in further detail via a network interface device. Network interface device may be utilized for connecting controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Controller 124 may include but is not limited to, for example, a computing device or cluster of computing devices in a first location and a second computing device or cluster of computing devices in a second location. Controller 124 may include one or more computing devices dedicated to data storage, security, distribution of traffic for load balancing, and the like. Controller 124 may distribute one or more computing tasks as described below across a plurality of computing devices of computing device, which may operate in parallel, in series, redundantly, or in any other manner used for distribution of tasks or memory between computing devices. Controller 124 may be implemented using a "shared nothing" architecture in which data is cached at the worker, in an embodiment, this may enable scalability of system 100 and/or computing device.

With continued reference to FIG. 1, controller 124 may be designed and/or configured to perform any method, method step, or sequence of method steps in any embodiment described in this disclosure, in any order and with any degree of repetition. For instance, controller 124 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 124 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, controller 124 is configured to receive pilot datum from the pilot control device 132. In a non-limiting embodiment, computing device 112 may receive pilot datum as a function of pilot control device 132. For example and without limitation, any maneuvers a pilot may perform may transmit a signal to computing device. In another non-limiting example, every movement or action performed by the pilot may trigger sensor 120 to detect the measured pilot input and generate pilot datum to be transmitted to computing device for further analysis and manipulation.

With continued reference to FIG. 1, controller 124 is configured to generate an action command based on the pilot datum and transmit an action command to at least a control surface. An "action command," as used in this disclosure, is a set of directions given to the control surface to achieve the intention of the user input device. In an embodiment, an action command may entail activating actuators to allow for braking in the wheels of the aircraft. In another embodiment, an action command may entail actuating ailerons to control the rudders. An action command may be a direct command from the user input device. An action command may also require controller 124 input. For example, pilot may press on one brake to initiate selective braking, however, the rudders may also activate to assist in changing the yaw of the aircraft. Controller 124 may use machine learning to determine which control surfaces are activated after given a pilot datum. A "control surface," as used herein, is any flight components such as ailerons, flaps, leading edge flaps, rudders, elevators, spoilers, slats, blades, stabilizers, stabilators, airfoils, a combination thereof, or any other moveable surface used to control an aircraft in a fluid medium thereby affecting flight. At least a control surface comprises at least an actuator. In one or more embodiments, actuators may include brake calipers, pneumatic pistons, hydraulic pistons, and/or solenoid pistons. In other embodiments, actuators 112 may use electrical components. For example, actuators may each include a hydraulic piston that extends or retracts to actuate flight component. In another example, actuators may each include a solenoid. Similarly, actuators may be triggered by electrical power, pneumatic pressure, hydraulic pressure, or the like. Actuators may also include electrical motors, servomotors, cables, and the like, as discussed further below. At least a control surface comprises a rudder. Rudder is discussed in further detail in FIG. 3. At least a control surface comprises a propulsor.

For the purposes of this disclosure, a "propulsor" is a component or device used to propel a craft by exerting force on a fluid medium, which may include a gaseous medium such as air or a liquid medium such as water. Propulsor may include any device or component that consumes electrical power on demand to propel an electric aircraft in a direction or other vehicle while on ground or in-flight. For example, and without limitation, propulsor may include a rotor, propeller, paddle wheel, and the like thereof. In an embodiment, propulsor may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment, propulsor may include a rotating power-driven hub, to which are attached several radial airfoil-section blades such that the whole assembly rotates about a longitudinal axis. A lift propulsor is further described in this disclosure with reference to FIG. 3. In one or more exemplary embodiments, propulsor may include a vertical propulsor or a forward propulsor. A forward propulsor may include a propulsor configured to propel aircraft 108 in a forward direction. A vertical propulsor may include a propulsor configured to propel aircraft 108 in an upward direction. One of ordinary skill in the art would understand upward to comprise the imaginary axis protruding from the earth at a normal angle, configured to be normal to any tangent plane to a point on a sphere (i.e. skyward). In an embodiment, vertical propulsor can be a propulsor that generates a substantially downward thrust, tending to propel an aircraft in an opposite, vertical direction and provides thrust for maneuvers. Such maneuvers can include, without limitation, vertical take-off, vertical landing, hovering, and/or rotor-based flight such as "quadcopter" or similar styles of flight.

In an embodiment, propulsor may include a propeller, a blade, or the like. The function of a propeller is to convert rotary motion from an engine or other power source into a swirling slipstream which pushes the propeller forwards or backwards. The propulsor may include a rotating power-driven hub, to which are attached several radial airfoil-section blades such that the whole assembly rotates about a longitudinal axis. The blade pitch of a propeller may, for example, be fixed, manually variable to a few set positions, automatically variable (e.g. a "constant-speed" type), or any combination thereof. In an exemplary embodiment, propellers for an aircraft may be designed to be fixed to their hub at an angle similar to the thread on a screw makes an angle to the shaft; this angle may be referred to as a pitch or pitch angle which will determine the speed of the forward movement as the blade rotates.

In an embodiment, a propulsor can include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

Still referring to FIG. 1, a propulsor may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1145 N to force aircraft to in a horizontal direction along the longitudinal axis. As a further non-limiting example, pusher component may twist and/or rotate to pull air behind it and, at the same time, push aircraft 108 forward with an equal amount of force. In an embodiment, and without limitation, the more air forced behind aircraft, the greater the thrust force with which aircraft 108 is pushed horizontally will be. In another embodiment, and without limitation, forward thrust may force aircraft 108 through the medium of relative air. Additionally or alternatively, plurality of propulsor may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Still referring to FIG. 1, sensor 120 may be used to determine the geospatial location of the aircraft. Sensors are discussed in further detail in FIG. 3. Geospatial location of the aircraft may include whether the aircraft is on the ground or airborne. While on the ground, controller may generate a different set of action commands than while airborne. The controller controls the at least a control surface when the aircraft is on the ground. For example and without limitation, controller may only control caliper 116 on wheel 104 while grounded. Additionally and without limitation, controller may control caliper 116 and rudder 304 while grounded. Controller may also only control rudder 304 while airborne. Controller controls the at least a control surface when the aircraft is airborne. The at least a control surface may include a rudder or aileron.

Still referring to FIG. 1, controller may set a predetermined threshold using a motion sensor, which may include without limitation any motion sensor described in this disclosure. Controller may generate an action command when a predetermined threshold for motion is met. Controller activates braking when forward rolling motion above a predetermined threshold is detected. For example, a predetermined threshold may be 0.1 m/s. In this example, if aircraft 300 rolls forward at a speed faster than 0.1 m/s, controller generates an action command to activate brake 108. This may be used to prevent accidental runaway aircrafts. Additionally, the controller activates braking when backward rolling motion above a predetermined threshold is detected. Similar to the previous example, if aircraft 300 rolls backward at a speed faster that 0.1 m/s, controller generates an action command to activate brake 108. This may be used to prevent accidental backwards rolling. "Rolling," as defined herein, is a movement of wheels that is not intentional.

Still referring to FIG. 1, action command may be generated based on a machine learning model as described below in FIG. 6. Machine learning model may be trained using training data. Training data may be made up of a plurality of training examples that each include examples of data to be inputted into the machine learning model (such pressure applied on brakes pedals, pressure applied on rudder pedals, air speed, wind, standard maneuvers, etc.) and examples of data to be output therefrom (such as pressure applied on brakes, angle of rudders, etc.). Training data may be implemented in any manner described below. Training data may be obtained from and/pr in the form of previous flight data or sections of previous flight data. Examples of flight data that may be used in training data may include pilot datum, sensor data, weather data, data about aircraft maneuverability, and the like.

Figure 3:
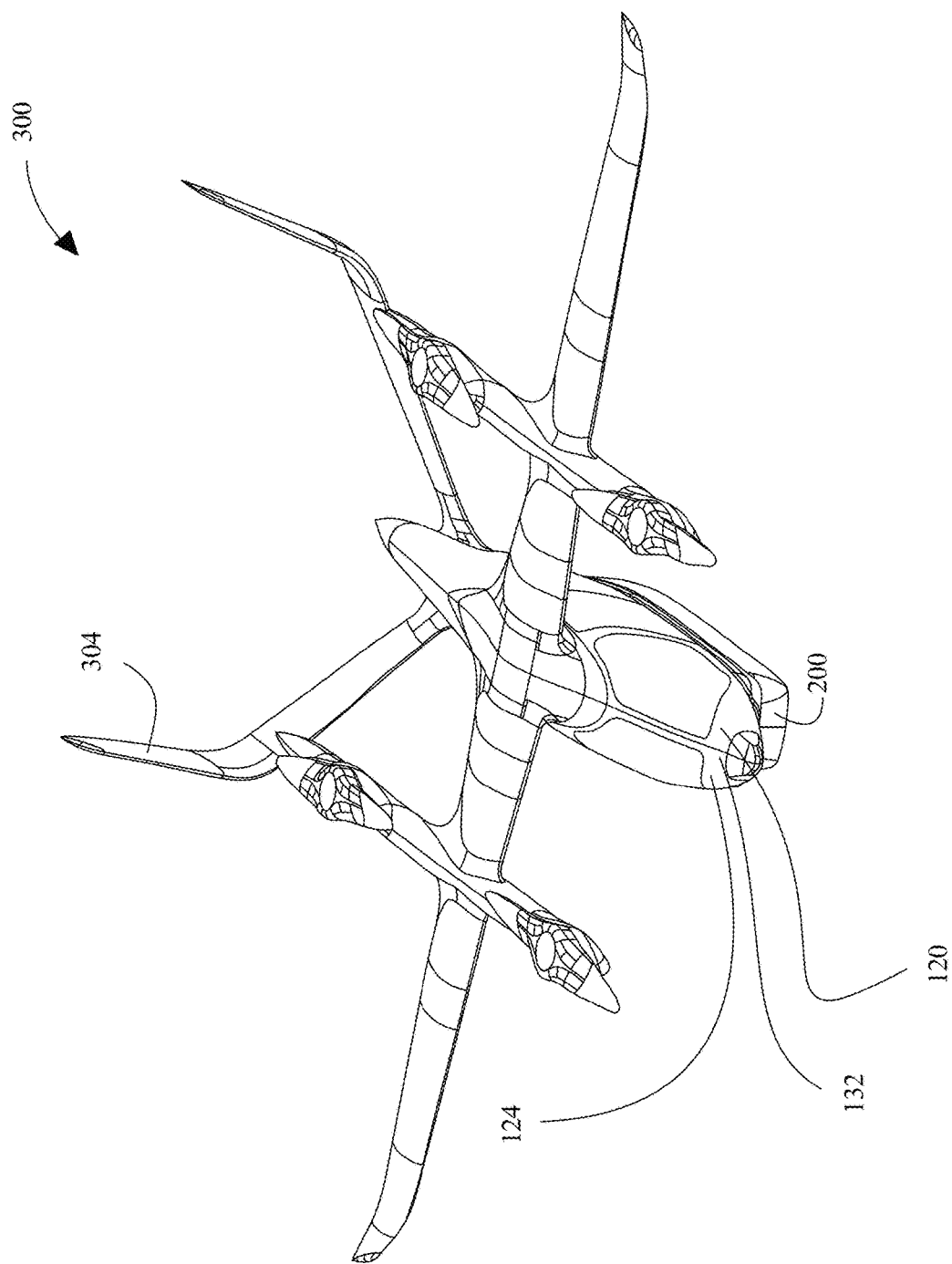
FIG. 3 is an exemplary embodiment of an electric vertical takeoff and landing aircraft.
Figure 4:
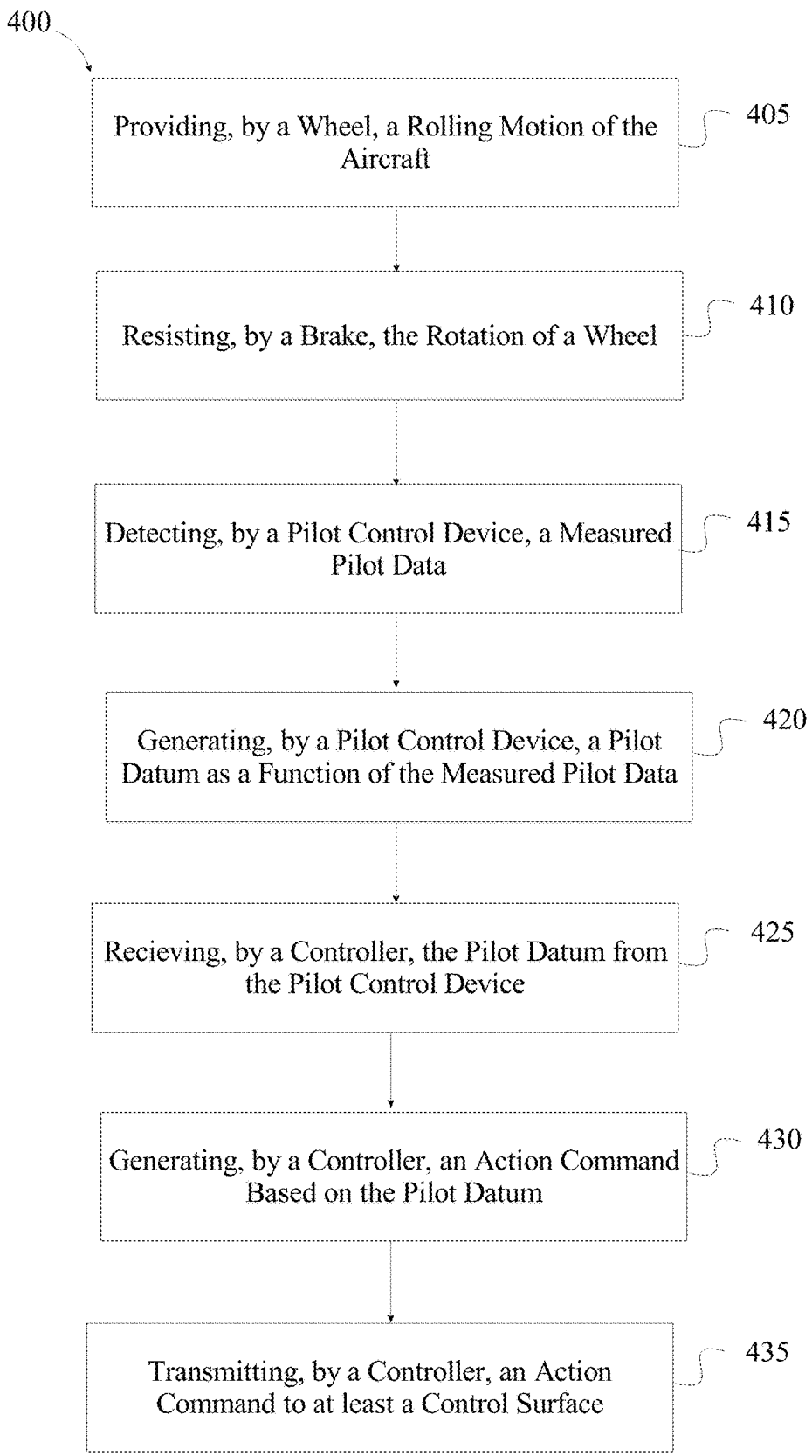

Now referring to FIG. 3, an embodiment of an electric vertical takeoff and landing aircraft 300 (also referred to as aircraft 300). Aircraft 300 may contain a controller 124, sensors, pilot control device 132, landing gear assembly, rudders, and the like. Landing gear assembly, in accordance with one or more embodiments of the present disclosure, may be located at the base of the aircraft. Landing gear assembly may function as a component of an undercarriage of an aircraft that supports the weight of the aircraft when it is not in the air. Landing gear assembly may be composed of any material suitable for composition of an aircraft as described above, including without limitation wood, fabric, aluminum, steel, titanium, polymers, carbon fiber, graphite-epoxy, epoxy fiber glass, fiber glass, metal alloys, epoxy resin, resin, composites, and the like. Landing gear assembly may be designed with a consideration of energy absorption during a landing or crash landing. Aircraft 300 may also contain one or more rudders. Rudder 304 may be located on the rear wings of the aircraft, as shown in FIG. 3.

Still referring to FIG. 3, aircraft 300 comprises a sensor 120 configured to at least detect the geospatial location of the aircraft. The sensor is further configured to determine an orientation of the eVTOL relative to any suitable reference frame or point, including ground, gravity vector, etc. Motion sensors, pressure sensors, or the like may be used to determine a geospatial location and an orientation of aircraft 300. Sensor may include a plurality of sensors. Plurality of sensors may be in the form of independent sensors. Plurality of sensors may also be in the form of a sensor suite. As used in this disclosure, a "sensor" is a device that is configured to detect an input and/or a phenomenon and transmit information related to the detection. Input may be from pilot control device 132, aircraft, environmental characteristic, and the like. In one or more embodiments, the information detected by may be transmitted in the form of an output sensor signal. For example, and without limitation, a sensor 120 may transduce a detected phenomenon, such as and without limitation, a brake pedal 128 position of pilot control device 132, or a rudder pedal position of pilot control device 132, into a sensed signal.

In one or more embodiments, sensor 120 may comprise a motion sensor. A "motion sensor," for the purposes of this disclosure, refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 120 includes an accelerometer that may be used to determine the deceleration of an aircraft to ensure braking is activated. Sensor 120 may also include, torque sensor, gyroscope, accelerometer, magnetometer, inertial measurement unit (IMU), pressure sensor, force sensor, proximity sensor, displacement sensor, vibration sensor, or the like. Motion sensors may be selected to detect motion in three directions spanning three dimensions. For instance, and without limitation, a pressure sensor may be used to detect the force on a brake pedal 128. In one or more embodiments, sensor 120 may include a position sensor. For example, system 100 may include an optical position sensor that includes a pair of opposing sensors configured to detect a position of the aircraft relative to the ground. An optical position sensor may be used by the controller 124 to determine the action command of the aircraft.

In one or more embodiments, aircraft may include an encoder. An encoder may be configured to detect and determine a motion of motor of a propulsor. For example, and without limitation, encoder may be a rotary encoder. In one or more embodiments, encoder may be communicatively connected to an actuator so that an actuator may be actuated depending on detections and determinations by encoder. In one or more exemplary embodiments, encoder is configured to determine a motion of motor, such as a speed in revolutions per minute of motor. Encoder is configured to transmit an output signal, which includes feedback, to actuator; as a result, actuator may actuated based on the received feedback from encoder. For example, and without limitation, actuator may be configured to actuate pin into the engagement position (extend pin toward mating face 136) or retain an engagement position when encoder detects no torque input from motor. In another example, and without limitation, actuator may be configured to actuate pin into a disengagement position or retain a disengagement position when encoder detects a torque of motor.

In one or more embodiments, sensor 120 comprises an inertial measurement unit (IMU). In one or more embodiments, an IMU may be configured to detect a change in specific force of a body. An IMU may include an accelerometer, a gyro sensor, a magnetometer, an E-compass, a G-sensor, a geomagnetic sensor, and the like. In some embodiments, sensor 120 may include one or more motion sensors. Sensor 120 may include one or more environmental sensors, including without limitation sensors for detecting wind, speed, temperature, or the like.

In some embodiments, sensor 120 may include a pressure sensor. For the purposes of this disclosure and as would be appreciated by someone of ordinary skill in the art, "pressure" is a measure of force required to stop a fluid from expanding and is usually stated in terms of force per unit area. The pressure sensor that may be included in sensor 120 may be configured to measure an atmospheric pressure and/or a change of atmospheric pressure. In some embodiments, the pressure sensor may include an absolute pressure sensor, a gauge pressure sensor, a vacuum pressure sensor, a differential pressure sensor, a sealed pressure sensor, and/or other unknown pressure sensors or alone or in a combination thereof. In one or more embodiments, a pressure sensor may include a barometer. In some embodiments, a pressure sensor may be used to indirectly measure fluid flow, speed, water level, and altitude. In some embodiments, the pressure sensor may be configured to transform a pressure into an analogue electrical signal. In some embodiments, the pressure sensor may be configured to transform a pressure into a digital signal. In an exemplary embodiment, and without limitation, a pressure sensor may be used to determine a force applied by caliper 116 to brake pad. The wheel 104 may include a sensor configured to detect pressure on the wheels. Pressure sensor may be used to determine the geospatial location of the aircraft 300.

In one or more embodiments, sensor 120 may include electrical sensors. Electrical sensors may be configured to measure voltage across a component, electrical current through a component, and resistance of a component. In one or more embodiments, sensor 120 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 120, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

Figure 5:
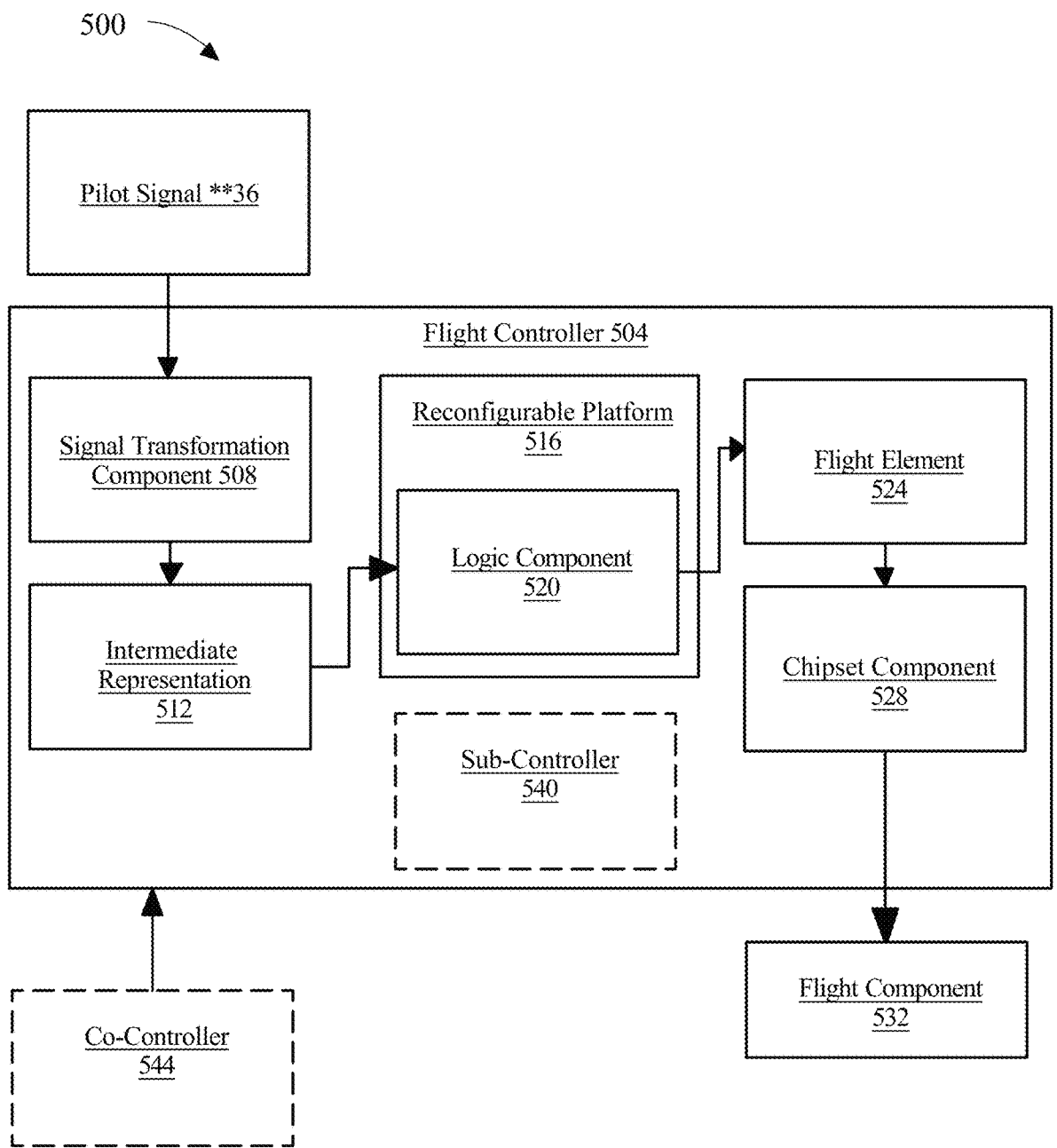
FIG. 5 is an exemplary representation of a flight controller.

Now referring to FIG. 5, an exemplary embodiment 500 of a flight controller 504 is illustrated. As used in this disclosure a "flight controller" is a computing device of a plurality of computing devices dedicated to data storage, security, distribution of traffic for load balancing, and flight instruction. Flight controller 504 may include and/or communicate with any computing device as described in this disclosure, including without limitation a microcontroller, microprocessor, digital signal processor (DSP) and/or system on a chip (SoC) as described in this disclosure. Further, flight controller 504 may include a single computing device operating independently, or may include two or more computing device operating in concert, in parallel, sequentially or the like; two or more computing devices may be included together in a single computing device or in two or more computing devices. In embodiments, flight controller 504 may be installed in an aircraft, may control the aircraft remotely, and/or may include an element installed in the aircraft and a remote element in communication therewith.

In an embodiment, and still referring to FIG. 5, flight controller 504 may include a signal transformation component 508. As used in this disclosure a "signal transformation component" is a component that transforms and/or converts a first signal to a second signal, wherein a signal may include one or more digital and/or analog signals. For example, and without limitation, signal transformation component 508 may be configured to perform one or more operations such as preprocessing, lexical analysis, parsing, semantic analysis, and the like thereof. In an embodiment, and without limitation, signal transformation component 508 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 508 may include transforming one or more low-level languages such as, but not limited to, machine languages and/or assembly languages. For example, and without limitation, signal transformation component 508 may include transforming a binary language signal to an assembly language signal. In an embodiment, and without limitation, signal transformation component 508 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 5, signal transformation component 508 may be configured to optimize an intermediate representation 512. As used in this disclosure an "intermediate representation" is a data structure and/or code that represents the input signal. Signal transformation component 508 may optimize intermediate representation as a function of a data-flow analysis, dependence analysis, alias analysis, pointer analysis, escape analysis, and the like thereof. In an embodiment, and without limitation, signal transformation component 508 may optimize intermediate representation 512 as a function of one or more inline expansions, dead code eliminations, constant propagation, loop transformations, and/or automatic parallelization functions. In another embodiment, signal transformation component 508 may optimize intermediate representation as a function of a machine dependent optimization such as a peephole optimization, wherein a peephole optimization may rewrite short sequences of code into more efficient sequences of code. Signal transformation component 508 may optimize intermediate representation to generate an output language, wherein an "output language," as used herein, is the native machine language of flight controller 504. For example, and without limitation, native machine language may include one or more binary and/or numerical languages.

In an embodiment, and without limitation, signal transformation component 508 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q-k-1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 5, flight controller 504 may include a reconfigurable hardware platform 516. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 516 may be reconfigured to enact any algorithm and/or algorithm selection process received from another computing device and/or created using machine-learning processes.

Still referring to FIG. 5, reconfigurable hardware platform 516 may include a logic component 520. As used in this disclosure a "logic component" is a component that executes instructions on output language. For example, and without limitation, logic component may perform basic arithmetic, logic, controlling, input/output operations, and the like thereof. Logic component 520 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 520 may be organized according to Von Neumann and/or Harvard architecture as a non-limiting example. Logic component 520 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 520 may include one or more integrated circuit microprocessors, which may contain one or more central processing units, central processors, and/or main processors, on a single metal-oxide-semiconductor chip. Logic component 520 may be configured to execute a sequence of stored instructions to be performed on the output language and/or intermediate representation 512. Logic component 520 may be configured to fetch and/or retrieve the instruction from a memory cache, wherein a "memory cache," as used in this disclosure, is a stored instruction set on flight controller 504. Logic component 520 may be configured to decode the instruction retrieved from the memory cache to opcodes and/or operands. Logic component 520 may be configured to execute the instruction on intermediate representation 512 and/or output language. For example, and without limitation, logic component 520 may be configured to execute an addition operation on intermediate representation 512 and/or output language.

In an embodiment, and without limitation, logic component 520 may be configured to calculate a flight element 524. As used in this disclosure a "flight element" is an element of datum denoting a relative status of aircraft. For example, and without limitation, flight element 524 may denote one or more torques, thrusts, airspeed velocities, forces, altitudes, groundspeed velocities, directions during flight, directions facing, forces, orientations, and the like thereof. For example, and without limitation, flight element 524 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 524 may denote that aircraft is following a flight path accurately and/or sufficiently.

Still referring to FIG. 5, flight controller 504 may include a chipset component 528. As used in this disclosure a "chipset component" is a component that manages data flow. In an embodiment, and without limitation, chipset component 528 may include a northbridge data flow path, wherein the northbridge dataflow path may manage data flow from logic component 520 to a high-speed device and/or component, such as a RAM, graphics controller, and the like thereof. In another embodiment, and without limitation, chipset component 528 may include a southbridge data flow path, wherein the southbridge dataflow path may manage data flow from logic component 520 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 528 may manage data flow between logic component 520, memory cache, and a flight component 532. As used in this disclosure a "flight component" is a portion of an aircraft that can be moved or adjusted to affect one or more flight elements. For example, flight component 532 may include a component used to affect the aircrafts' roll and pitch which may comprise one or more ailerons. As a further example, flight component 532 may include a rudder 304 to control yaw of an aircraft. In an embodiment, chipset component 528 may be configured to communicate with a plurality of flight components as a function of flight element 524. For example, and without limitation, chipset component 528 may transmit to an aircraft rotor to reduce torque of a first lift propulsor and increase the forward thrust produced by a pusher component to perform a flight maneuver.

In an embodiment, and still referring to FIG. 5, flight controller 504 may be configured generate an autonomous function. As used in this disclosure an "autonomous function" is a mode and/or function of flight controller 504 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 524. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 504 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 504 will control the ailerons and/or rudders. As used in this disclosure "non-autonomous mode" is a mode that denotes a pilot will control aircraft and/or maneuvers of aircraft in its entirety.

In an embodiment, and still referring to FIG. 5, flight controller 504 may generate autonomous function as a function of an autonomous machine-learning model. As used in this disclosure an "autonomous machine-learning model" is a machine-learning model to produce an autonomous function output given flight element 524 and a pilot signal 536 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 536 may denote that a pilot is controlling and/or maneuvering ailerons, wherein the pilot is not in control of the rudders and/or propulsors. In an embodiment, pilot signal 536 may include an implicit signal and/or an explicit signal. For example, and without limitation, pilot signal 536 may include an explicit signal, wherein the pilot explicitly states there is a lack of control and/or desire for autonomous function. As a further non-limiting example, pilot signal 536 may include an explicit signal directing flight controller 504 to control and/or maintain a portion of aircraft, a portion of the flight plan, the entire aircraft, and/or the entire flight plan. As a further non-limiting example, pilot signal 536 may include an implicit signal, wherein flight controller 504 detects a lack of control such as by a malfunction, torque alteration, flight path deviation, and the like thereof. In an embodiment, and without limitation, pilot signal 536 may include one or more explicit signals to reduce torque, and/or one or more implicit signals that torque may be reduced due to reduction of airspeed velocity. In an embodiment, and without limitation, pilot signal 536 may include one or more local and/or global signals. For example, and without limitation, pilot signal 536 may include a local signal that is transmitted by a pilot and/or crew member. As a further non-limiting example, pilot signal 536 may include a global signal that is transmitted by air traffic control and/or one or more remote users that are in communication with the pilot of aircraft. In an embodiment, pilot signal 536 may be received as a function of a tri-state bus and/or multiplexor that denotes an explicit pilot signal should be transmitted prior to any implicit or global pilot signal.

Still referring to FIG. 5, autonomous machine-learning model may include one or more autonomous machine-learning processes such as supervised, unsupervised, or reinforcement machine-learning processes that flight controller 504 and/or a remote device may or may not use in the generation of autonomous function. As used in this disclosure "remote device" is an external device to flight controller 504. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 5, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 504 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 5, flight controller 504 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 504. Remote device and/or FPGA may transmit a signal, bit, datum, or parameter to flight controller 504 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 504 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 5, flight controller 504 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 5, flight controller 504 may include, but is not limited to, for example, a cluster of flight controllers in a first location and a second flight controller or cluster of flight controllers in a second location. Flight controller 504 may include one or more flight controllers dedicated to data storage, security, distribution of traffic for load balancing, and the like. Flight controller 504 may be configured to distribute one or more computing tasks as described below across a plurality of flight controllers, which may operate in parallel, in series, redundantly, or in any other manner used for distribution of tasks or memory between computing devices. For example, and without limitation, flight controller 504 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 5, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 532. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 5, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 504. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 512 and/or output language from logic component 520, wherein output language may include one or more analog-to-digital conversions, low bit rate transmissions, message encryptions, digital signals, binary signals, logic signals, analog signals, and the like thereof described above in detail.

Still referring to FIG. 5, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 5, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 5, flight controller 504 may also be implemented using a "shared nothing" architecture in which data is cached at the worker, in an embodiment, this may enable scalability of aircraft and/or computing device. Flight controller 504 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function ω, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 5, flight controller may include a sub-controller 540. As used in this disclosure a "sub-controller" is a controller and/or component that is part of a distributed controller as described above; for instance, flight controller 504 may be and/or include a distributed flight controller made up of one or more sub-controllers. For example, and without limitation, sub-controller 540 may include any controllers and/or components thereof that are similar to distributed flight controller and/or flight controller as described above. Sub-controller 540 may include any component of any flight controller as described above. Sub-controller 540 may be implemented in any manner suitable for implementation of a flight controller as described above. As a further non-limiting example, sub-controller 540 may include one or more processors, logic components and/or computing devices capable of receiving, processing, and/or transmitting data across the distributed flight controller as described above. As a further non-limiting example, sub-controller 540 may include a controller that receives a signal from a first flight controller and/or first distributed flight controller component and transmits the signal to a plurality of additional sub-controllers and/or flight components.

Still referring to FIG. 5, flight controller may include a co-controller 544. As used in this disclosure a "co-controller" is a controller and/or component that joins flight controller 504 as components and/or nodes of a distributer flight controller as described above. For example, and without limitation, co-controller 544 may include one or more controllers and/or components that are similar to flight controller 504. As a further non-limiting example, co-controller 544 may include any controller and/or component that joins flight controller 504 to distributer flight controller. As a further non-limiting example, co-controller 544 may include one or more processors, logic components and/or computing devices capable of receiving, processing, and/or transmitting data to and/or from flight controller 504 to distributed flight control system. Co-controller 544 may include any component of any flight controller as described above. Co-controller 544 may be implemented in any manner suitable for implementation of a flight controller as described above.

In an embodiment, and with continued reference to FIG. 5, flight controller 504 may be designed and/or configured to perform any method, method step, or sequence of method steps in any embodiment described in this disclosure, in any order and with any degree of repetition. For instance, flight controller 504 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 6:
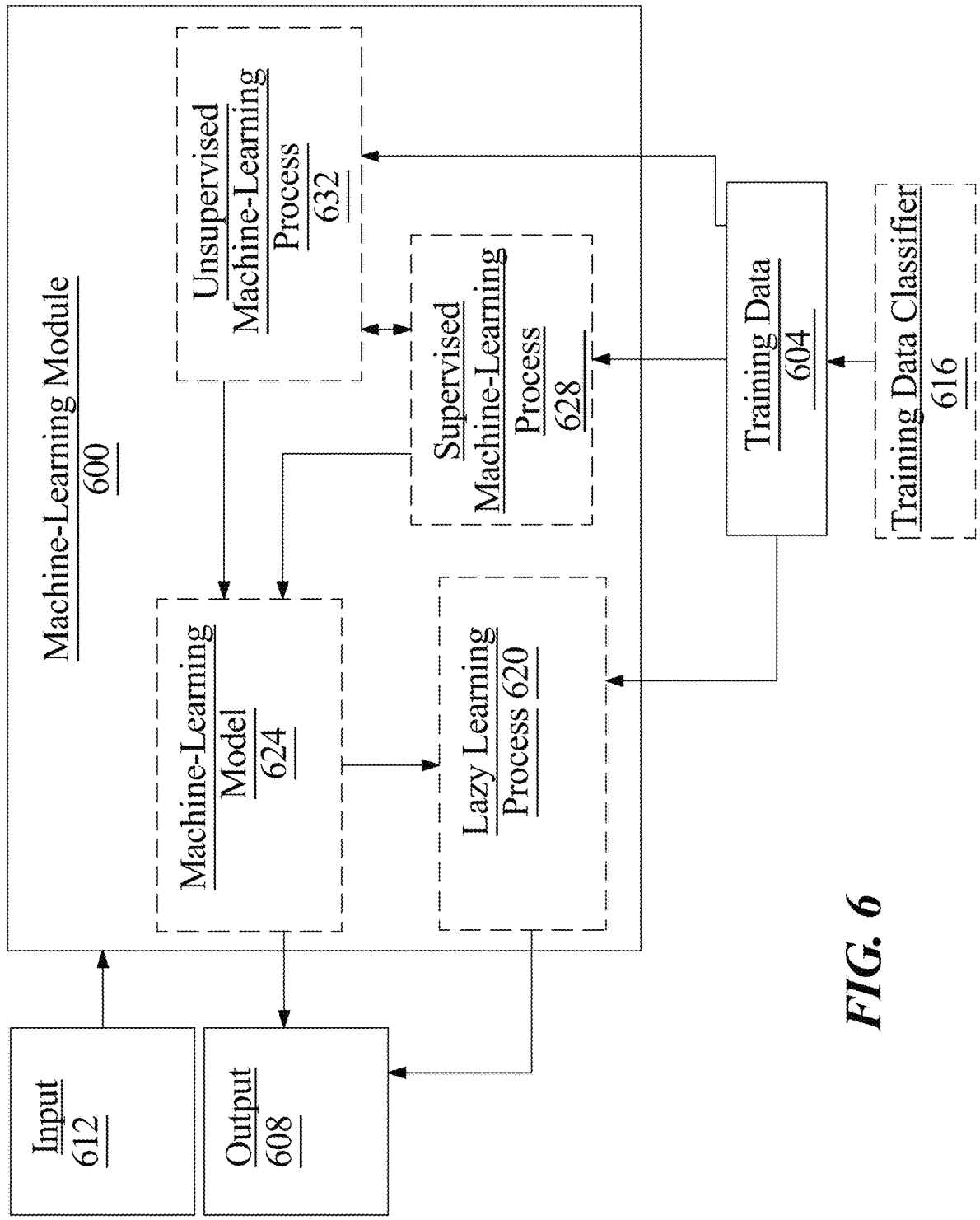
FIG. 6 is an exemplary representation of a machine learning model.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example flight elements and/or pilot signals may be inputs, wherein an output may be an autonomous function.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
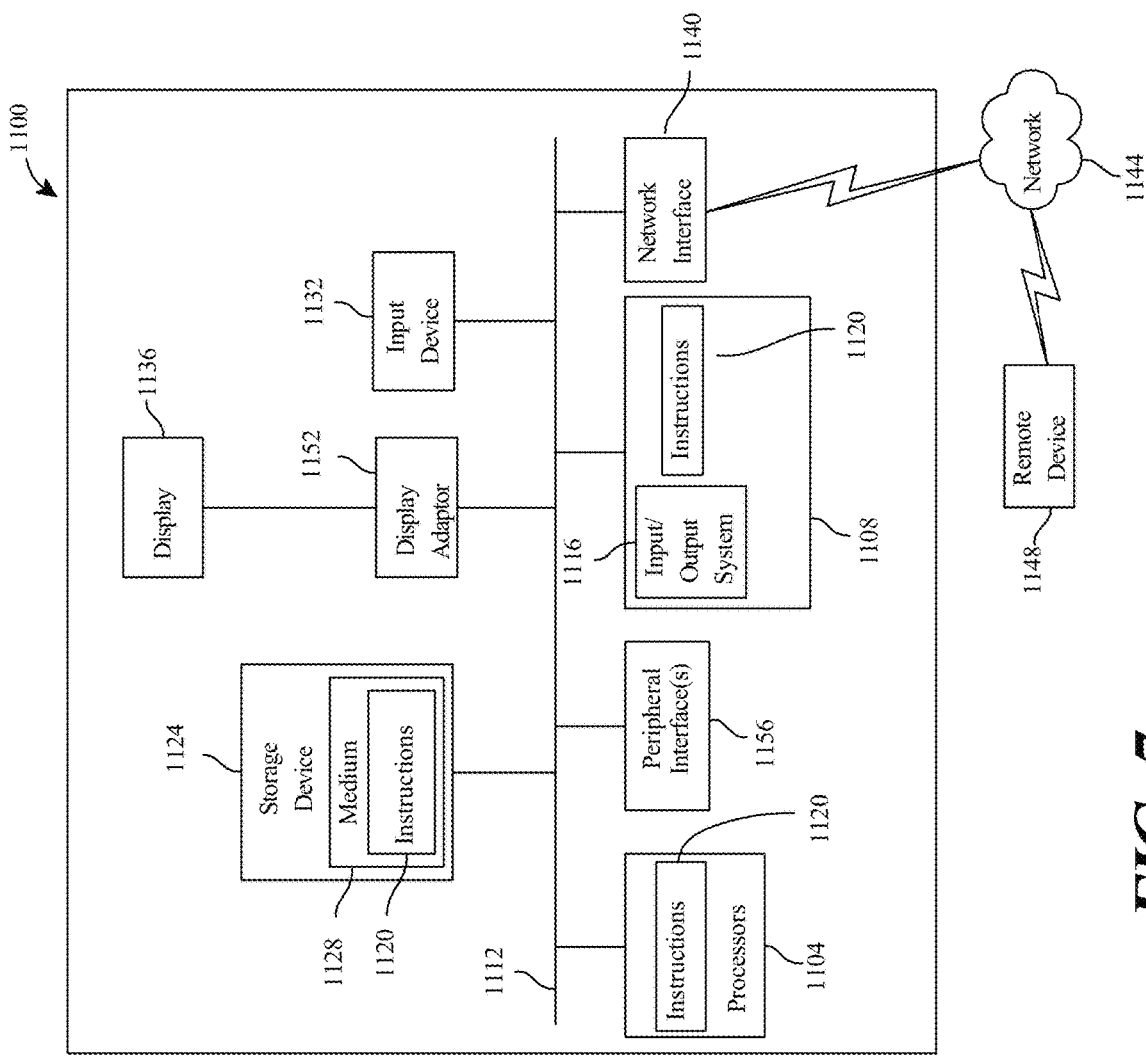
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A braking system for an electric vertical takeoff and landing aircraft, the system comprising:
   a wheel configured to allow rolling motion of the aircraft on the ground, wherein the wheel is a part of the aircraft, the wheel comprising a first wheel and a second wheel;
   a skid component at an undercarriage of the aircraft and configured to support the aircraft on the ground, wherein the skid component comprises a skid tube comprising:
      a recess, wherein the recess houses the wheel and is configured to allow the wheel to rotate freely; and
      a biasing mechanism, wherein the biasing mechanism is configured to generate an elastic recoil force to allow the wheel to extend or retract in the recess; and
   a brake configured to resist rotation of the wheel, the brake comprising a first brake configured to resist rotation of the first wheel and a second brake configured to resist rotation of the second wheel;
   a pilot control device, the pilot control device configured to:
      detect a measured pilot input, the measured pilot input comprising selective braking by the first brake to steer the aircraft while the aircraft is in motion on the ground; and
      generate a pilot datum as a function of the measured pilot input;
   a controller communicatively connected to the aircraft and the pilot control device, the controller configured to:
      receive the pilot datum from the pilot control device;
      generate an action command based on the pilot datum; and
      transmit an action command to at least a control surface, the at least a control surface comprises a caliper, wherein a pressure sensor is used to determine a force applied by the caliper to the brake pad and the caliper interacts with the brake pad to resist rotation of a wheel, the first brake, and a rudder of the aircraft, wherein transmitting the action command comprises:
         controlling operation of the caliper of the first brake to resist rotation of the first wheel to steer the aircraft on the ground; and
         controlling operation of the rudder to control yaw of the aircraft to steer the aircraft on the ground.

2. The system of claim 1, wherein the at least a control surface comprises at least an actuator.

3. The system of claim 1, wherein the at least a control surface comprises a propulsor.

4. The system of claim 1, wherein the at least a control surface comprises a rudder.

5. The system of claim 1, wherein the pilot control device comprises a brake pedal.

6. The system of claim 1, wherein the pilot control device comprises a rudder pedal.

7. The system of claim 1, wherein the pilot control device comprises a sensor configured to at least detect a position of a pedal.

8. The system of claim 7, wherein the sensor comprises an accelerometer.

9. The system of claim 1, wherein the aircraft comprises a sensor configured to at least detect a geospatial location of the aircraft, wherein the geospatial location includes a ground location and an airborne location.

10. The system of claim 9, wherein the sensor is further configured to determine an orientation of the aircraft relative to a reference frame or point including ground and gravity vector.

11. The system of claim 1, wherein the wheel comprises a sensor configured to detect pressure on the wheels.

12. The system of claim 1, wherein the wheel comprises at least the first wheel on a first side of the aircraft and at least the second wheel on a second side of the aircraft.

13. The system of claim 12, wherein the brake allows for steering of the aircraft through selective braking of the wheels.

14. The system of claim 13, wherein selective braking of the wheels comprises only engaging the brake on either the at least a first wheel or the at least a second wheel.

15. The system of claim 1, wherein the brake includes a regenerative brake configured to generate electrical energy.

16. The system of claim 1, wherein the controller controls the at least a control surface when the aircraft is on the ground.

17. The system of claim 1, wherein the controller controls the at least a control surface when the aircraft is airborne.

18. The system of claim 1, wherein the controller activates braking when forward rolling motion above a predetermined threshold is detected.

19. The system of claim 1, wherein the controller activates braking when backward rolling motion above a predetermined threshold is detected.

* * * * *